United States Patent Office 2,820,816
Patented Jan. 21, 1958

2,820,816

PREPARATION OF α,β-DICHLOROPROPIONIC ACID ESTERS

Harry D. Anspon, Easton, Pa., assignor to General Aniline & Film Corporation, New York, N. Y., a corporation of Delaware No Drawing. Application December 17, 1956
Serial No. 628,501

13 Claims. (Cl. 260—487)

This invention relates to an improved process for the preparation of esters of α,β-dichloropropionic acid by reaction of the corresponding acrylic acid esters with chlorine.

The preparation of α,β-dichloropropionic esters by reaction of the corresponding acrylic esters with chlorine is complicated by side reactions which result in the formation of dimers and other high boiling by-products which interfere with recovery of the α,β-dichloropropionic ester in satisfactory yields. Temperature control is difficult, since the reaction is highly exothermic and after an excessive rise in temperature, only a minor amount of α,β-dichloropropionic ester can be recovered.

According to U. S. Patent 2,320,034 and Journal of the American Chemical Society, 62, pages 3495 to 3498, acrylic esters can be chlorinated in solution in chloroform or methanol. The separation of these solvents from the reaction mixture is inconvenient and costly. An attempt to prepare an α,β-dichloropropionic methyl ester by chlorination of the corresponding acrylic ester in methanol was unsuccessful in that no fraction of satisfactory purity could be recovered from the reaction mixture by fractional distillation. All fractions had an index of refraction ($N_D^{25}$) below 1.4493 as compared with 1.45108 for pure methyl α,β-dichloropropionate.

It has also been proposed to employ bromine as a catalyst in chlorination of methyl acrylate at 0° C. in U. S. Patent 2,195,712. It was found that a pure product could be obtained by this method but only in yields of 10% of theory. Attempts to chlorinate methyl acrylate at lower temperatures in the presence of other catalysts such as iodine or mercuric sulfate sometimes produced higher yields, but the results were found unreliable and the yields generally insufficient to render the process satisfactory for commercial use.

In accordance with application Serial No. 200,090, filed December 9, 1950, now U. S. Patent 2,612,519, esters of α,β-dichloropropionic acid of satisfactory purity are reliably produced in yields of the order of 40 to 50% by non-catalytic treatment of the corresponding acrylic ester with chlorine at temperatures from —10 to 80° C.

I have discovered that the esters of α,β-dichloropropionic acid can be prepared reliably in much higher yields and readily recovered from the reaction mixture in a high state of purity by reacting chlorine with the corresponding acrylic esters in the presence of a weak-N-heterocyclic base, particularly a base having a dissociation constant in water at 25° C. of $10^{-8}$ to $10^{-10}$. In particular, such bases are pyridine, α-, β-, and γ-picolines or mixtures thereof, quinoline, isoquinoline, acridine, phenazine, N - methyl- or N-ethyl-morpholine, benzothiazole, benzoxazole, 2-methyl-5-ethyl pyridine, and the like.

It is therefore an object of this invention to provide a new and useful process for the preparation of esters of α,β-dichloropropionic acid by the interaction of chlorine and acrylic esters in the presence of a weak-N-heterocyclic base.

It is a further object of this invention to provide a new and useful process for the preparation of esters of α,β-dichloropropionic acid by the interaction of chlorine and acrylic esters in the presence of a weak-N-heterocyclic base in which the heterocyclic nitrogen is tertiary.

It is another object of my invention to provide a new and useful process for the preparation of esters of α,β-dichloropropionic acid by the interaction of chlorine and acrylic esters in the presence of a weak-N-heterocyclic base which process may be carried out either batchwise or in continuous manner.

Other objects will appear hereinafter as the description proceeds.

The amount of N-heterocyclic base employed can be varied from 1% to 10% of the weight of the acrylic ester, but an amount corresponding to 1.5% to 6.5% by weight of the amount of acrylic ester is preferred. Temperatures up to about 100° C. can be employed, and the temperature can be varied over a wide range without seriously affecting the yield. Thus, it was found that a variation in the temperature from —10° to 78° C. in the batch caused only small variations in the yield. The reaction can be carried out in the vapor phase, but in general, liquid phase chlorination is preferred, and temperatures from 0° to 50° C. are considered most satisfactory from the standpoint of convenience for said batch process.

In the continuous method of carrying out the process, temperatures also may be varied within the range as indicated above but in this embodiment it is preferred to employ temperatures at the upper range of contemplated reaction temperatures, that is, at temperatures from about 50° to 100° C. In the continuous method the residence time of the reactants will vary depending upon the particular selected temperature and the surface to volume ratio of the reactants. The larger this ratio, the lower the residence time. Within the contemplated and preferred range of operable temperatures, this ratio may vary from 1 to 25, and the necessary residence times then will be from about 1 minute to one hour. Ratios greater than 25 may of course be used but are usually not necessary or economically feasible since excellent yields are forthcoming in so short a time (as for example, 1 minute) within the contemplated ratios. Where the ratio is less than unity the process becomes less efficient due to non-uniformity of temperatures throughout the reaction mass due to the expected heat transfer problems arising in such instances. In general, it is preferred to carry out the process wherein the aforementioned ratio is from about 5 to 15 and the residence time from about 5 to 25 minutes. These conditions are obtained most readily at temperatures of from about 70° to 95° C. It is, of course, understood that the different acrylic esters will vary in their reactivity in the halogenation reaction and that the above described preferred conditions of residence time, surface to volume ratio and temperature are preferred since the said conditions yield the most outstanding product in most instances, and in particular with the lower alkyl esters of acrylic acid such as methyl acrylate and ethyl acrylate.

The acrylic esters subjected to chlorination in accordance with this invention may contain a polymerization inhibitor (e. g., 0.25% of hydroquinone) to prevent polymerization thereof. Such inhibitors have no appreciable effect on the chlorination. Moisture in substantial amounts, such as 5 to 10% of the acrylic ester, substantially reduces the yield of α,β-dihalopropionic ester. However, smaller amounts (e. g., up to about 1%) can be present without seriously impairing the results of the reaction.

The acrylic esters which can be halogenated according to this invention include acrylic esters of aliphatic, araliphatic, alicyclic, and heterocyclic mono- and poly-hydric alcohols, e. g., acrylic esters of methanol, butanol, dodecyl, and octadecyl alcohol, ethylene glycol, propylene glycol, glycerol, butanediol, cyclohexanol, tetrahydroabietinol, benzyl alcohol, and tetrahydrofuryl alcohol.

Specific esters which can be employed in the processes of this invention include:

Methyl arcylate
Eethyl acrylate
n-Propyl acrylate
iso-propyl acrylate
n-Butyl acrylate
n-Hexyl acrylate
Octyl acrylate
n-Dodecyl acrylate
Octadecyl acrylate
Benzyl acrylate
Phenyl ethyl acrylate
Cyclohexyl acrylate
Methylcyclohexyl acrylate
Tetrahydrofurfuryl acrylate
Ethylene glycol mono-, di-, and mixed esters with acrylic acid, e. g., acetate-acrylate
Propylene glycol mono-, di- and mixed esters with acrylic acid The esters of alcohols containing olefinic double bonds can also be chlorinated according to the invention, but such chlorination ordinarily results in saturation of the double bond in the unsaturated alcohol radical, yielding a saturated chloroalkyl ester of $\alpha,\beta$-dichloropropionic acid. Examples of such esters are:

Allyl acrylate
Methallyl acrylate, and the like.

My invention is illustrated by the following examples, wherein parts and percentages are by weight, unless otherwise indicated. The relation of parts by volume to parts by weight is such that one part by volume is the volume occupied by one part by weight of water.

*Example 1*

2370 parts (2880 parts by volume) of freshly distilled methyl acrylate (boiling point 41° C. at 174 mm. Hg) were mixed with 88 parts by volume of pyridine. The mixture was agitated and chlorine passed through the liquid while cooling externally with ice. Introduction of chlorine was at such a rate as to prevent the reaction temperature from rising above 40° C. Absorption of chlorine decreased at the end of 6 hours, and treatment with a relatively slow stream of chlorine was continued for about three additional hours. The reaction mixture was then washed with a solution of 55 parts by volume of concentrated sulfuric acid in 1000 parts by volume of water. After separating the aqueous washing liquid, the water-immiscible reaction products were further washed with 1000 parts by volume of water. The water-immiscible product was then subjected to steam distillation, and after separating the organic portion of the distillate, the latter was dried over anhydrous magnesium sulfate. An analysis for chlorine indicated the product to be substantially pure methyl $\alpha,\beta$-dichloropropionate, its index of refraction ($N_D^{25}$) being 1.4508. Upon fractional distillation with separation into 13 equal fractions, the first two fractions had a boiling point of 57° to 61° C. at 10 mm. Hg, and the remaining fractions boiled constant at 63° C. at 10 mm. Hg. The index of refraction of the first two fractions was 1.4507 and 1.4508, respectively, and that of the final fraction was 1.4511; whereas the intermediate fractions had an index of refraction of 1.4510. The yield amounted to 4353 parts, or 87% of theory.

*Example 2*

3130 parts of freshly distilled methyl acrylate, as employed in Example 1, were mixed with 100 parts by volume of pyridine. The mixture was treated with chlorine in the same manner as described in Example 1. Chlorine analysis of the product obtained by steam distillation and drying was found to be substantially pure methyl $\alpha,\beta$-dichloropropionate, having an index of refraction ($N_D^{25}$) of 1.4507. Fractional distillation confirmed the purity of the product. A yield of 4900 parts (about 85% of theory) was obtained.

*Example 3*

3130 parts of freshly distilled methyl acrylate, as employed in Example 1, but containing 0.16% of water, was mixed with 100 parts by volume of pyridine containing 0.43% water. The mixture was chlorinated, washed, steam distilled, and dried, as in Example 1. Methyl $\alpha,\beta$-dichloropropionate was obtained, having an index of refraction ($N_D^{25}$) of 1.4510, and was recovered in a yield of 5212 parts, corresponding to 91% of theory. Upon dehydrochlorination of the resulting product, methyl $\alpha$-chloroacrylate was recovered, having a freezing point of $-36.75°$ C. indicating a purity of 99.9 mol %.

*Example 4*

In a series of chlorinations of methyl acrylate, using varying amounts of pyrodine and small amounts of hydroquinone in the reaction mixture, the following results were obtained:

| Methyl acrylate (parts by volume) | Pyridine (parts by volume) | Percent Hydroquinone | Reaction temperature, ° C. | Percent of theoretical yield |
|---|---|---|---|---|
| 3,600 | 100 | 0.25 | 35 | 75 |
| 3,300 | 100 | 0.25 | 30 | 79 |
| 3,300 | 200 | 0.25 | 30 | 78 |
| 3,300 | 150 | 0.25 | 40 | 81 |
| 3,300 | 50 | 0.25 | 40 | 76 |
| 3,300 | 100 | 0.25 | 80 | 76 |
| 3,300 | 100 | 0.25 | -10 | 75 |

*Example 5*

The procedures of Example 4 were repeated except that in lieu of pyridine, $\alpha$-picoline was used and the results in yield were comparable to those obtained in Example 4.

*Example 6*

The procedure of Example 1 is repeated employing quinoline in lieu of the pyridine of that example. The yield in this instance was 89%.

*Example 7*

The procedure of Example 2 is repeated using N-methyl morpholine in lieu of pyridine. The yield here was 86% of theory.

*Example 8*

This example illustrates the continuous method for the chlorination of the acrylic esters and specifically methyl acrylate. The apparatus employed comprises a coil 10 meters in length of 6 mm. internal diameter glass tubing immersed in a water bath maintained at 90° C. Into one end of the tube there is introduced a mixture of methyl acrylate, pyridine, and chlorine at the rate of about 30 g. per minute of methyl acrylate, about 0.9 g. of pyridine (3% based on the weight of the acrylate), and a slight excess of stoichiometric amount of chlorine for said 30 g. of methyl acrylate. The surface to volume ratio of the reaction vessel (that is, the tubing) is about 6.5. The total residence time for the reaction mass is about 9 minutes. At the temperature of 90° C. employed herein the exiting mixture analyzed for a conversion to the dichloropropionate of 96%. This mixture when treated as described in Example 1 by washing and steam distillation followed by drying gave an overall yield of substantially pure methyl-$\alpha,\beta$-dichloropropionate of 88%.

Example 9

The procedure of Example 8 is repeated employing, however, only 2% pyridine catalyst based on the weight of the methyl acrylate. The yield from the chlorination step is 92% and the overall yield about 85%, that is, after washing, steam distillation and drying.

Example 10

The procedure of Example 8 is again repeated using, however, the following catalysts in the amounts indicated:

3% $\alpha$-picoline
3% $\beta$-picoline
2% quinoline
3% phenazine
3% N-methyl morpholine
2.5% acridine
4% benzothiazole In each instance there was a recovery of from 94 to 96% dichloropropionate from the first step of the process and after washing, steam distilling and drying, yields of the order of 86 to 88% pure methyl-$\alpha,\beta$-dichloropropionate were obtained.

Example 11

The procedure of Example 8 is repeated employing the pyridine catalyst cited therein and, additionally, runs were made with the catalysts of the preceding example and in the amounts cited therein. The process of Example 8 is modified to the extent that the temperature is maintained at 75° C. and the through-put rate of reactants is such as to give a total residence time of about 20 minutes. The overall yields of purified methyl-$\alpha,\beta$-dichloropropionate range from about 83 to 88%.

Example 12

The procedures of Example 11 are repeated employing, however, a coil of tubing having a surface to volume ratio of about 10 (that is, a tubing of about 4 mm. internal diameter). The through-put of reactants is adjusted to give a total residence time of about 5 minutes. The yields obtainable here are comparable to those of Example 11.

Example 13

The procedures of Example 12 are repeated except that the temperature of the reactants is maintained at 90° C. The yields are similar to those obtained in the preceding example.

Example 14

The procedure of Example 8 is repeated employing, however, 30 g. of ethyl acrylate, the other factors being the same. An overall yield of 87% of ethyl $\alpha,\beta$-dichloropropionate is obtained.

Example 15

The procedures of Example 10 are repeated using ethyl acrylate in place of methyl acrylate. The yields of the corresponding ethyl ester are comparable to those obtained in that example.

Example 16

The procedures of Example 12 are repeated employing ethyl acrylate instead of methyl acrylate. Again, the yields are comparable to those of Example 12.

Example 17

The procedure of Example 8 is repeated except that the temperature of the reaction is held at 0° C. and the residence time increased to 1 hour. The overall yield of the methyl $\alpha,\beta$-dichloropropionate was 73%.

Example 18

The procedure of Example 8 is again repeated employing, however, a temperature of 50° C. and a corresponding residence time of 30 minutes. The ultimate yield of pure ester is 87%.

Example 19

The procedure of Example 14 is repeated employing a temperature in the reaction zone of 100° C. and a corresponding residence time of the reactants of about 6 minutes, the latter brought about by increasing the rate of flow of the reactants. The yield of exceptionally pure ethyl ester is 86%.

Example 20

The procedure of Example 16 is repeated except that a temperature of 95° C. is employed. With a residence time of 3 minutes by adjustment of the throughput of the reactants, the yields of purified ethyl ester range from 82 to 87%.

Instead of the methyl and ethyl acrylates employed in the foregoing examples, there can be substituted the acrylic esters of other aliphatic, araliphatic, alicyclic, and heterocyclic alcohols mentioned in the discussion preceding the examples. With such other alcohols, yields corresponding to those obtained in the above examples are achieved in the case of each of these other esters. In addition to those tertiary bases specifically exemplified, it is possible to employ those others also described in the discussion preceding the examples and further, it is possible to employ not only the amines singly but in admixture. This is particularly advantageous in the case of the picolines because mixtures thereof are readily obtainable at low cost.

Variations and modifications which will be obvious to those skilled in the art can be made in the processes herein described without departing from the scope or spirit of this invention.

This application is a continuation in part of my application Serial No. 325,895, filed December 13, 1952, now abandoned.

I claim:

1. A process for the preparation of an ester of $\alpha,\beta$-dichloropropionic acid which comprises chlorinating an acrylic ester of an alcohol in the presence of from about 1 to about 10% by weight based on the weight of the acrylic ester of a weak N-heterocyclic base having a dissociation constant in water at 25° C. of $10^{-8}$ to $10^{-10}$, in which the heterocyclic nitrogen is tertiary.

2. A process for the preparation of an ester of $\alpha,\beta$-dichloropropionic acid which comprises chlorinating an acrylic ester of an alcohol in the presence of from about 1.5 to about 6.5% by weight based on the weight of the acrylic ester of a weak N-heterocyclic base having a dissociation constant in water at 25° C. of $10^{-8}$ to $10^{-10}$, in which the heterocyclic nitrogen is tertiary, at a temperature of from about —10° to 100° C.

3. A process for the preparation of an ester of $\alpha,\beta$-dichloropropionic acid which comprises chlorinating an acrylic ester of an alcohol in the presence of from about 1.5 to about 6.5% by weight based on the weight of the acrylic ester of a weak N-heterocyclic base having a dissociation constant in water at 25° C. of $10^{-8}$ to $10^{-10}$, in which the heterocyclic nitrogen is tertiary, at a temperature of from about 0° to 50° C.

4. A process for the preparation of an ester of $\alpha,\beta$-dichloropropionic acid which comprises chlorinating an acrylic ester of an alcohol in the presence of from about 1.5 to about 6.5% by weight based on the weight of the acrylic ester of a weak N-heterocyclic base having a dissociation constant in water at 25° C. of $10^{-8}$ to $10^{-10}$, in which the heterocyclic nitrogen is tertiary, at a temperature of from about 50° to 100° C.

5. A process for the preparation of an ester of $\alpha,\beta$-dichloropropionic acid which comprises chlorinating methyl acrylate in the presence of from about 1 to about 10% by weight based on the weight of the methyl acrylate, of a weak N-heterocyclic base having a dissociation constant in water at 25° C. of $10^{-8}$ to $10^{-10}$, in which the heterocyclic nitrogen is tertiary.

6. A process for the preparation of an ester of $\alpha,\beta$-dichloropropionic acid which comprises chlorinating methyl acrylate in the presence of from about 1.5 to 6.5% by weight based on the weight of the methyl acrylate of pyridine at a temperature of from about 0° to 50° C.

7. A process for the preparation of an ester of $\alpha,\beta$-dichloropropionic acid which comprises chlorinating methyl acrylate in the presence of from about 1.5 to 6.5% by weight based on the weight of the methyl acrylate of pyridine at a temperature of from about 50° to 100° C.

8. A continuous process for the preparation of an ester of $\alpha,\beta$-dichloropropionic acid which comprises introducing into a reaction zone at a temperature of from about 0° to 100° C. a mixture comprising an acrylic ester of an alcohol, a weak N-heterocyclic base having a dissociation constant in water at 25° C. of $10^{-8}$ to $10^{-10}$, in which the heterocyclic nitrogen is tertiary, in an amount of from about 1 to about 10% by weight based on the weight of the acrylic ester, and a slight excess of a stoichiometric amount of chlorine based on the acrylic ester, and withdrawing the resultant dichloropropionic ester.

9. A continuous process for the preparation of methyl $\alpha,\beta$-dichloropropionate which comprises introducing into a reaction zone maintained at a temperature of from about 50° to 100° C. a mixture comprising methyl acrylate, pyridine amounting to about from 1.5 to 6.5% thereof based on the weight of the methyl acrylate, and chlorine in an amount sufficient to give the corresponding dichloropropionate, maintaining said reactants at a temperature from about 50° to about 100° C. for a time sufficient to form said dichloropropionate ester, and thereafter withdrawing the said dichloropropionate ester.

10. A continuous process for the preparation of methyl $\alpha,\beta$-dichloropropionate which comprises introducing a mixture consisting essentially of methyl acrylate, pyridine amounting to about 3% by weight thereof based on the weight of methyl acrylate, and a slight excess of the stoichiometric amount of chlorine based on the amount of methyl acrylate present into a reaction zone at a temperature of about 90° C. and thereafter continuously withdrawing methyl $\alpha,\beta$-dichloropropionate after a time sufficient within said reaction zone to form the said dichloropropionate ester.

11. A continuous process for the preparation of methyl $\alpha,\beta$-dichloropropionate which comprises introducing a mixture consisting essentially of methyl acrylate, $\alpha$-picoline amounting to about 3% by weight thereof based on the weight of methyl acrylate, and a slight excess of the stoichiometric amount of chlorine based on the amount of methyl acrylate present into a reaction zone at a temperature of about 90° C. and thereafter continuously withdrawing methyl $\alpha,\beta$-dichloropropionate after a time sufficient within said reaction zone to form the said dichloropropionate ester.

12. A continuous process for the preparation of methyl $\alpha,\beta$-dichloropropionate which comprises introducing a mixture consisting essentially of methyl acrylate, N-methyl morpholine amounting to about 3% by weight thereof based on the weight of methyl acrylate, and a slight excess of the stoichiometric amount of chlorine based on the amount of methyl acrylate present into a reaction zone at a temperature of about 90° C. and thereafter continuously withdrawing methyl $\alpha,\beta$-dichloropropionate after a time sufficient within said reaction zone to form the said dichloropropionate ester.

13. A continuous process for the preparation of methyl $\alpha,\beta$-dichloropropionate which comprises introducing a mixture consisting essentially of methyl acrylate, 2-methyl-5-ethyl pyridine amounting to about 3% by weight thereof based on the weight of methyl acrylate, and a slight excess of the stoichiometric amount of chlorine based on the amount of methyl acrylate present into a reaction zone at a temperature of about 90° C. and thereafter continuously withdrawing methyl $\alpha,\beta$-dichloropropionate after a time sufficient within said reaction zone to form the said dichloropropionate ester.

References Cited in the file of this patent

UNITED STATES PATENTS 2,647,923    Burton _____ Aug. 4, 1953

FOREIGN PATENTS 707,852    Germany _____ July 5, 1941

OTHER REFERENCES

Brintzinger et al.: Angew. Chem., A 60 (1948), pp. 311–312.